(12) United States Patent
Taylor et al.

(10) Patent No.: US 9,902,033 B1
(45) Date of Patent: Feb. 27, 2018

(54) TOOLING BASE

(71) Applicants: Chris Taylor, San Diego, CA (US);
Steve Grangetto, San Diego, CA (US);
Adam Lane, San Diego, CA (US)

(72) Inventors: Chris Taylor, San Diego, CA (US);
Steve Grangetto, San Diego, CA (US);
Adam Lane, San Diego, CA (US)

( * ) Notice: Subject to any disclaimer, the term of this patent is extended or adjusted under 35 U.S.C. 154(b) by 0 days.

(21) Appl. No.: 15/617,204

(22) Filed: Jun. 8, 2017

(51) Int. Cl.
*B25B 1/02* (2006.01)
*B23Q 3/10* (2006.01)
*B23Q 3/18* (2006.01)
*F16B 2/12* (2006.01)
*B25B 1/24* (2006.01)

(52) U.S. Cl.
CPC .............. *B23Q 3/102* (2013.01); *B23Q 3/186* (2013.01); *B25B 1/24* (2013.01); *F16B 2/12* (2013.01)

(58) Field of Classification Search
CPC ......... B25B 1/103; B25B 1/2489; B25B 1/24; B25B 1/2405; B25B 1/00; B25B 1/10
USPC .................................. 269/165, 265; 279/112
See application file for complete search history.

(56) References Cited

U.S. PATENT DOCUMENTS

| | | | | |
|---|---|---|---|---|
| 8,020,877 B2* | 9/2011 | Lang | ..................... | B25L 31/103 279/112 |
| 8,702,077 B2* | 4/2014 | Liu | ..................... | B25L 35/163 269/165 |
| 8,708,323 B2 | 4/2014 | Hoyt et al. | | |
| 9,364,937 B2* | 6/2016 | Taylor | ..................... | B25B 1/24 |
| 2004/0256780 A1 | 12/2004 | Lang | | |
| 2007/0187909 A1 | 8/2007 | Troxler | | |
| 2013/0043634 A1 | 2/2013 | Kitaura et al. | | |
| 2015/0158150 A1* | 6/2015 | Taylor | ..................... | B25B 1/2405 409/225 |

FOREIGN PATENT DOCUMENTS

WO   WO2016116346   7/2016

OTHER PUBLICATIONS

Jergens manufacturing, Catalog Fixture-Pro(R) multi-axis quick change fixture, http://www.jergensinc.com/site/templates/PDFs/Multi-AXIS_0216.pdf, visited Jun. 8, 2017.

* cited by examiner

*Primary Examiner* — Todd M Epps

(74) *Attorney, Agent, or Firm* — Mark Wisnosky

(57) ABSTRACT

A tooling base that is an improvement over current designs in the form of simplified number of parts and easier manufacturing of parts is described. The tooling base uses alignment fixtures on threaded rods that are restricted in their movement within the tooling base by stops. The stops are located either on the threaded shafts or on the alignment fixtures. This allowed degree of movement enables simplified part design and manufacture while maintaining the precision and accuracy of registration of a tooling fixture with the tooling base.

9 Claims, 9 Drawing Sheets

TOOLING BASE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Technical Field

The present invention relates to a tooling base that is used to attach a variety of tooling fixtures that would hold a workpiece to a work surface for machining. The base allows the fixtures and workpieces to be removed and re-attached while maintain registration accuracy.

Related Background Art

A tooling fixture is used to hold a workpiece during intricate machining such as 5 axis machining. The fixture system requires that the workpiece be held securely and precisely and provides access to a machine tool to all facets of the workpiece. Preferably it is possible to prepare the raw stock and easily and removably mount the stock in the fixture to present to a machine to create a part. Often Tooling fixtures are mounted directly to the bed or work surface of the milling machine. However, in many cases it is necessary to process a part on different machines requiring the part to be removed from one machine, worked or processed elsewhere and returned to the first machine. It is important that upon reinstallation the registration of the part to the tooling fixture to the machine is maintained to very tight tolerances. A solution to this problem is a tooling base. This is a system that attaches to a milling or other machining device and is precisely registered to that device. A vise or other fixture is then attached to the tooling base, again with precise registration to the tooling base, and therefore to the machining device. The tooling base further provides means to detach and re-attach the tooling fixture while maintaining precise registration. Tooling bases are known, such as those described in U.S. Pat. No. 8,708,323 and US patent application 20040256780. However, the internal design of the known tooling bases, especially the mechanism that is used to clamp and release the tooling fixture to the base, are complicated and difficult to manufacture. In some case precision parts are designed such that they require machining, heat treatment, and then additional machining after heat treatment to compensate for dimensional changes during heat treatment. In other cases, the mechanism is made up of a large number of precision parts that require multiple surfaces to fit together to ensure precise registration.

There is a need for improved design in tooling bases that are easy to manufacture, have few parts and still maintain precise registration of the tooling fixture to the tooling base and the tooling base to the machine, and, enable removal and reattachment of the tooling fixture. There is a need for a tooling fixture that can be easily adapted to precisely locate a plurality of types and numbers of tooling fixtures.

An improved design for a tooling base that addresses the defects in prior art designs is described.

BRIEF DESCRIPTION OF THE DRAWINGS

Features are numbered equivalently through all drawings.

DETAILED DESCRIPTION OF THE INVENTION

Figure 1:
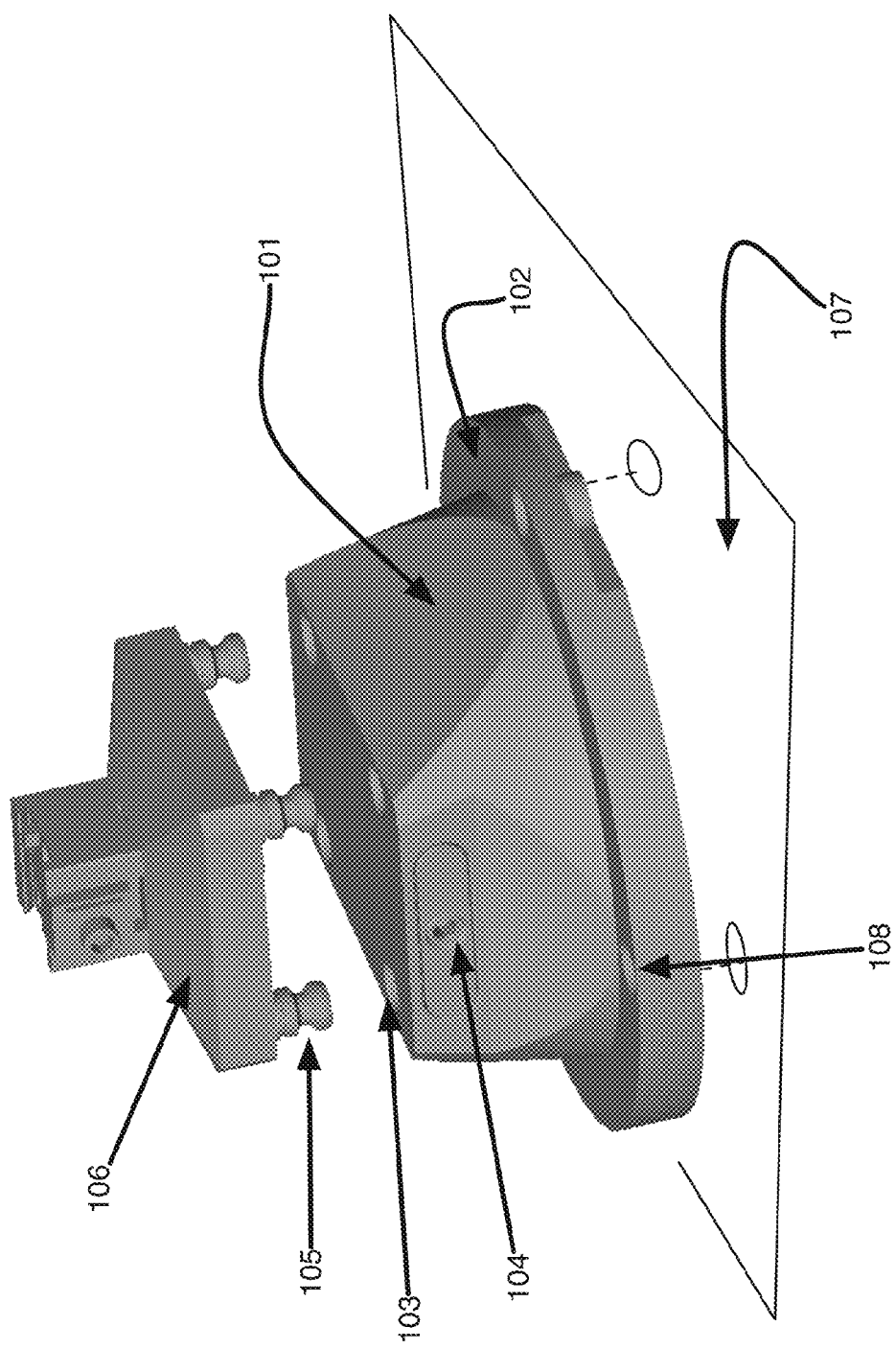
FIG. 1 is a top perspective view showing a tooling fixture as it would attach to a tooling base.

Referring to FIG. 1, a tooling fixture is shown. The tooling base 101 comprises a base platform 102 that is attached to the work surface 107 of a milling or other processing machine that requires precise registration. The attachment is through use of alignment pins and bolt holes 108 as are known in the art. The base further includes a plurality of registration holes 103 into which alignment studs 105 are inserted. A screw socket 104 is turned that operates an internal clamp to clamp the alignment studs 105 in the tooling holes 103 and thereby register the tooling fixture 106 to the base. The base 102 is registered to the milling or other processing machine using tooling pins (not shown) and bolts (not shown) as are known in the art. The tooling fixture 106 may be removed by actuating the screw socket 104 and lifting from the tooling base. The tooling base remains clamped and registered to the processing machine. The fixture may be reinserted to the base and upon actuating the screw is clamped via the alignment studs 105 to the tooling base and registration to the base is renewed. The tooling fixture may therefore be repeatedly attached to and removed from the tooling base and each time of reattachment, registration is maintained.

Figure 2:
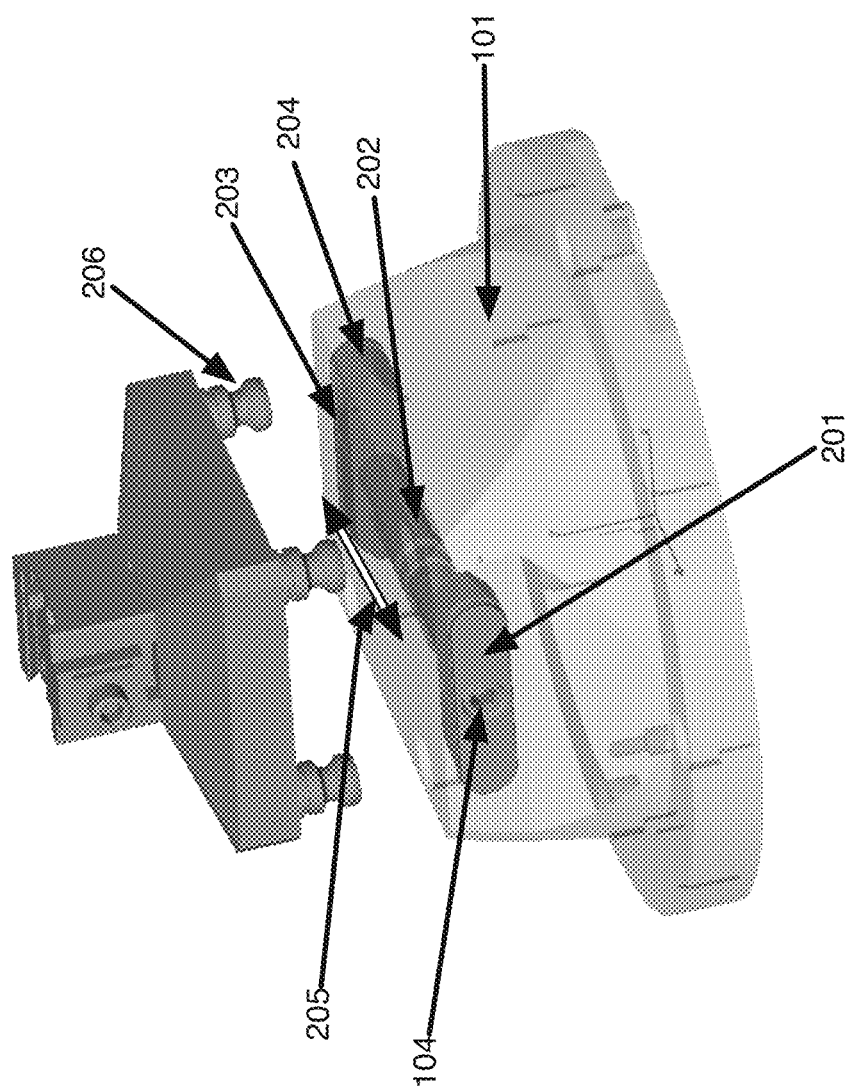
FIG. 2 is a view that shows the internal elements of the tooling base of FIG. 1.

FIG. 2 shows the internal components of the tooling base of FIG. 1. Common numbers refer to the same parts. The base 101 includes a pair of clamping fixture 201, 203 that are interconnected by a threaded shaft 202. The shaft is threaded with right and left handed threads at either end, such that turning the screw socket causes the clamping fixtures to move simultaneously either apart 205 or together on actuating the screw socket 104. The clamping fixtures 201, 203 include tapered regions 204 at each end that engage the indentations 206 on the alignment studs and when fully tightened against the alignment studs cause the alignment studs to be clamped against the inner wall of the tooling holes (103 FIG. 1) and register the tooling fixture to the base. Note, in this embodiment, operating the single screw socket causes simultaneous clamping of all four alignment studs. The clamping fixtures 201, 203 and the interconnecting threaded shaft 202 are loose within a region inside the base and have a degree of play that is determined by stops (shown in later detail) within the interior of the tooling base. The precise registration of the tooling base, the tooling fixture and the machine is through contact of the alignment studs with the inner walls of the tooling holes 103. The limited degree of play in the clamping mechanism results in a mechanism that requires fewer moving parts and reduced requirements as to accuracy and precision while maintaining the precision and accuracy of the registration of the tooling fixture to the tooling base and therefore to the machine to which the base is attached.

Figure 3:
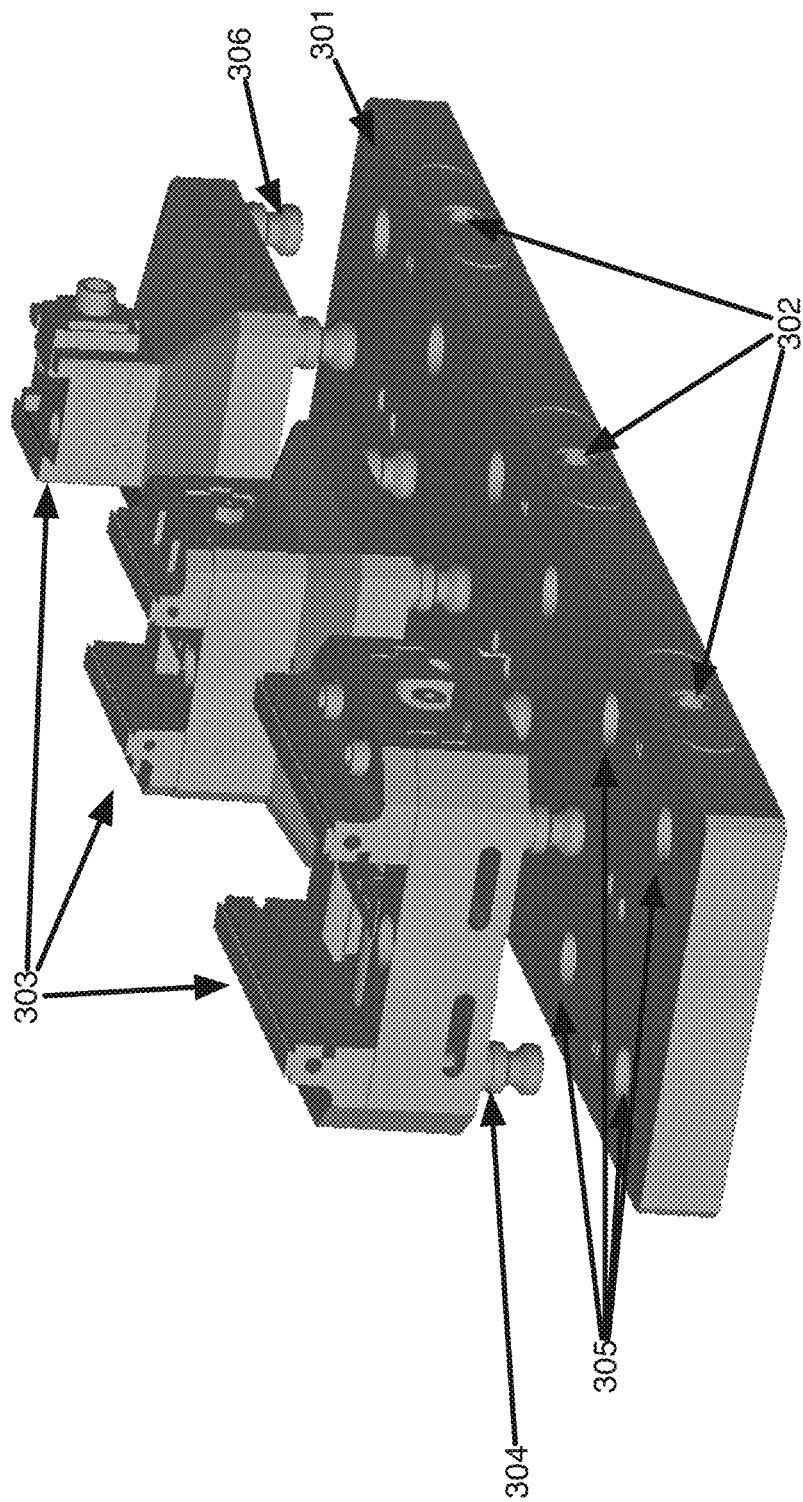
FIG. 3 shows a tooling base that accommodate a plurality of tooling fixtures.

FIG. 3 shows a tooling base 301 that includes positions to attach a plurality of tooling fixtures 303. The tooling fixtures need not all be identical. The tooling fixtures each include tooling holes (not visible) to which are attached the alignment studs 304 that include an indentation 306 that is engaged by the internal clamping fixtures (not visible) when the screw sockets 302 are actuated. Each of the tooling fixtures 303 may thereby be independently clamped to and removed from the tooling base 302.

The tooling base can include a variety of configurations (compare FIGS. 1 and 3) and hold a plurality of tooling fixtures also having a variety of configurations.

Figure 4A:
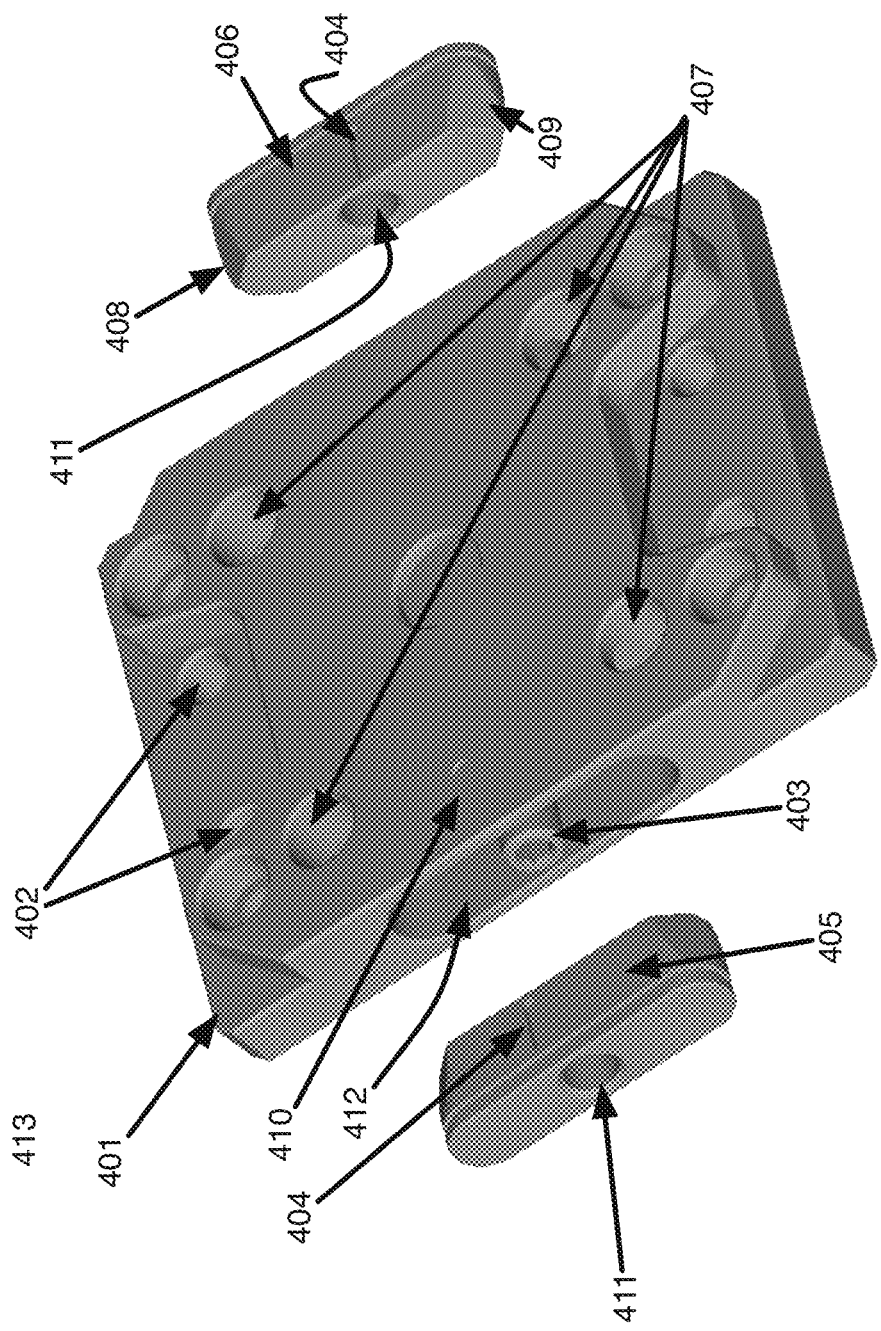
FIG. 4A shows additional detail of the parts of the invented tooling base.
Figure 4B:
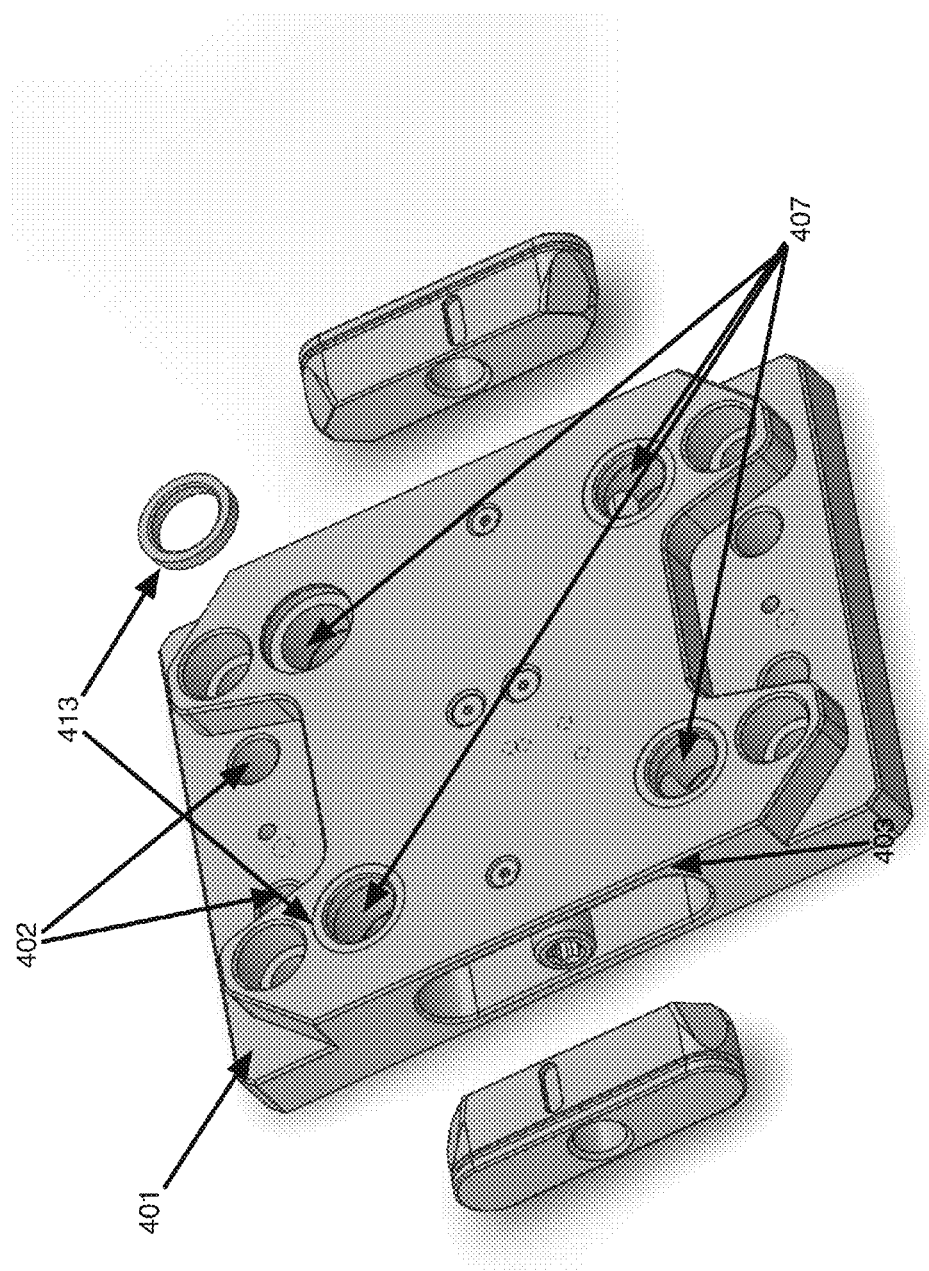
FIG. 4B shows the tooling base of FIG. 4A modified to accommodate use of softer materials for the base.

FIG. 4A shows yet another configuration of the tooling base with the common invented mechanism. The tooling base 401 is comprised of tooling pins (not shown) and bolt holes 402 that are used to clamp the tooling base to the work surface of a milling machine or other processing device. Note, in another embodiment, a plurality of bases may be stacked. The base of FIG. 4 can be one of the several fixtures 303 attached to the base 301 of FIG. 3. The tooling base 401 further includes clamping fixtures 405, 406 that fit inside slot 412 the fixtures are moveable towards and away from each other within the slot. The fixtures each include a threaded hole 411 that fits to the threaded shaft 403. Turning of the threaded shaft causes the clamping fixtures to move either towards one another or away from one another. When moving towards one another the fixtures move to clamp alignment studs (not shown) within the tooling holes 407 and thereby aligning a fixture attached to the alignment studs to the tooling base. In this embodiment the clamping fixtures each further include a slot 404 into which fits a pin 410. The pin and the slot act as a stop. The fixtures attached to the threaded shaft 403 are free to move within the slot 412 in a direction parallel to the shaft over a distance that is the length of the slot 404. As the shaft is rotated in a first direction the fixtures are pulled towards one another by rotation of the threaded shaft 403 in the threaded holes 411 The tapered ends 408, 409 on each of the fixtures (ends on only one fixture are labeled) engage the indentation (see for example 306, FIG. 3) and clamp the alignment studs against the wall of the tooling holes 407 and thereby align the fixture (not shown) to the base. Rotation of the threaded shaft in a second direction, opposite to that of the first direction causes the alignment fixtures to move apart thereby releasing the alignment studs from the tooling holes. In one embodiment the tooling base is made of steel. In another embodiment shown in FIG. 4B the tooling base is made of a relatively soft material and the tooling holes are lined with a relatively hard bushing 413. Non-limiting examples of the softer material include aluminum, iron, injection molded plastic, reinforced plastic and filled plastic. Non-limiting examples of a harder material used for the bushings include steel, titanium, ceramic, and, filled or reinforced that has a hardness rating higher than that used for the base.

Figure 5:
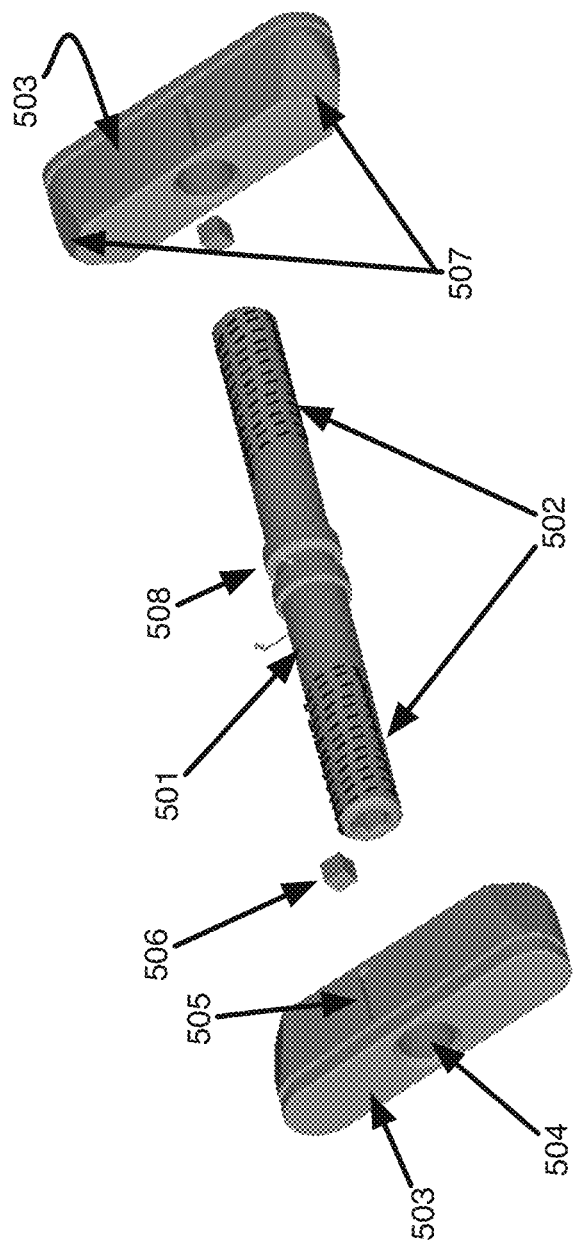
FIG. 5 shows details of a first embodiment of the internal components of the tooling base of FIG. 4.

Details of the internal components of the tooling base of FIG. 4 are shown in FIG. 5. The tooling base includes a pair of clamping fixtures 503 that are interconnected by a threaded shaft 501. Right and left hand threads 502 fit into threaded holes 504 such that rotation of the shaft in a first direction causes the clamping fixtures to move towards one another and rotation of the shaft in a second direction causes the clamping fixtures to move away from one another. In this embodiment each of the clamping fixtures include tapered ends 507 that engage indentations on the alignment studs (not shown) and thereby align and clamp the alignment studs to the tooling base. In this embodiment, stops are incorporated into each of the clamping fixtures. The stops are comprised of a slot 505 milled into a surface of the clamping fixture and a stud 506 that fits within the slit and limits movement of the clamping fixture to the length of the slot. The figure further shows ridges 508 that are incorporated on the threaded shaft 501. The ridges are used as stops in other embodiments and are not needed in the embodiment shown.

Figure 6:
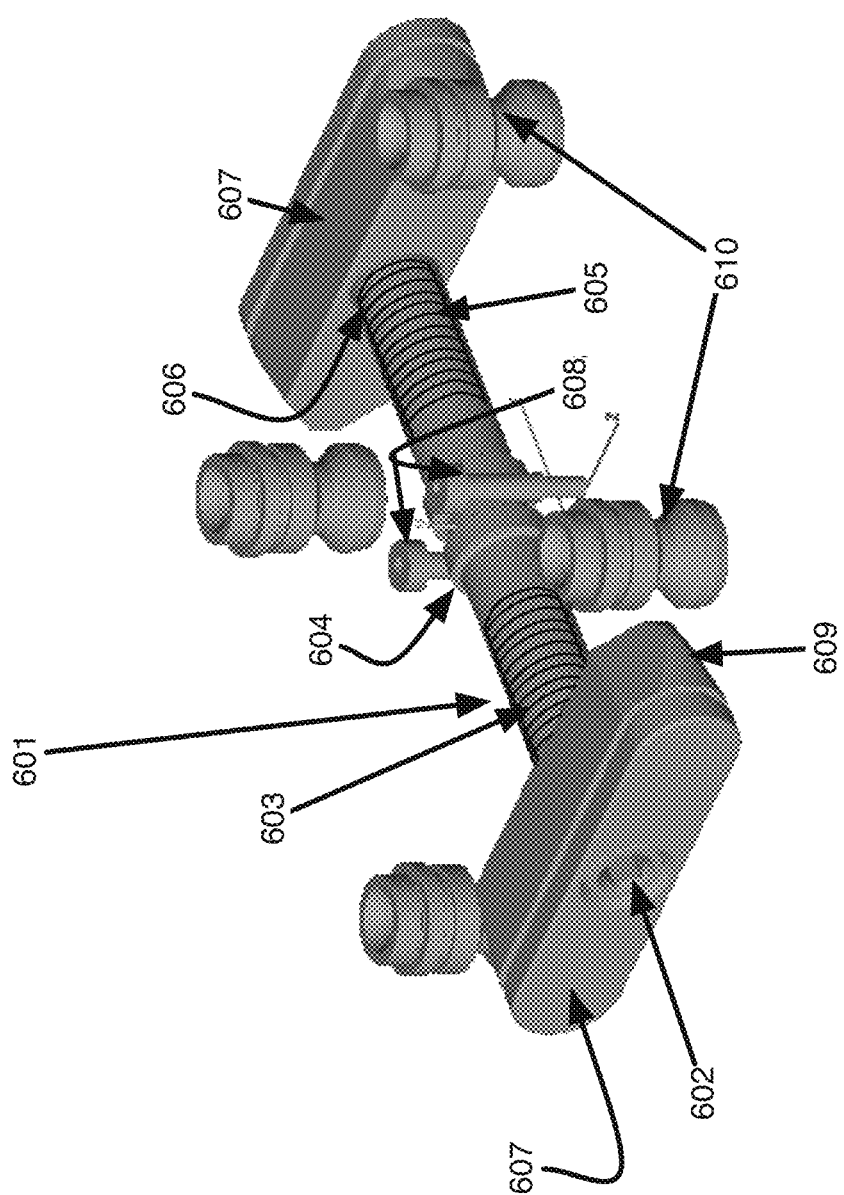
FIG. 6 shows details of a second embodiment of the internal components of the tooling base.

FIG. 6 shows a second embodiment of the internal components of the tooling base. The components include clamping fixtures 607 that are fitted to a threaded shaft 601 through threaded holes 602. The threads on the shaft 603, 605 include left hand and right hand threads such that rotation of the shaft causes the clamping fixture to move towards and away from one another. In this embodiment each end 609 of the clamping fixtures are tapered to engage an indentation on the alignment studs 610 thereby clamping the alignment studs in place when the shaft is rotated to bring the clamping fixtures towards one another. The tooling base further includes a stop. The stop is comprised of a pair of ridges 604 incorporated on the shaft and cylindrical posts 608 that fit between the ridges and thereby restrict the movement of the combined assembly of the alignment fixtures and the shaft to the width of the region between the ridges 604. Note that in this embodiment and the previous one movement of the alignment fixtures by rotation of the threaded shaft 601 causes simultaneous clamping and release, of four of the alignment studs 610.

Figure 7:
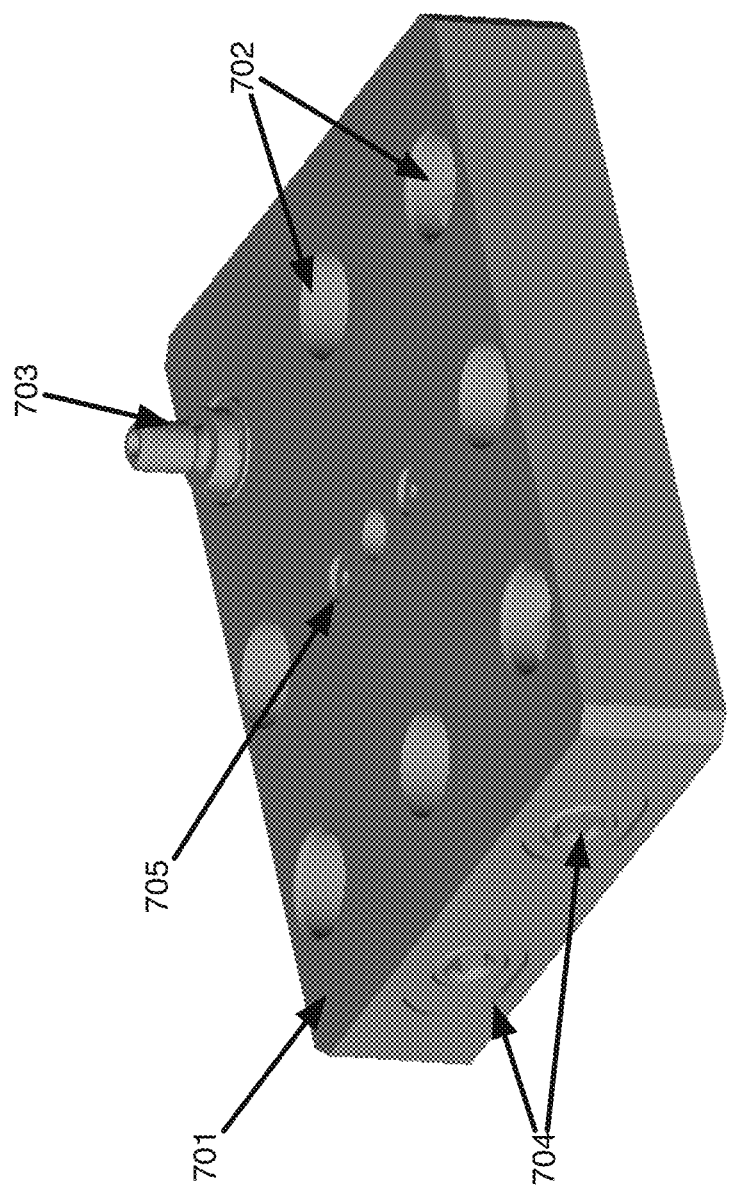
FIG. 7 shows a tooling base that uses a third embodiment of the internal components.

A third embodiment of the tooling base is shown in FIG. 7. The tooling base 701 is comprised of a base that is registered and clamped to a milling or other processing machine as is known in the art and the base includes tooling holes 702 into which are fitted alignment studs 703. This embodiment includes at least one threaded shaft (two are shown in the example) that when rotated causes clamping fixtures (best seen in FIG. 8) to engage the alignment studs and clamp the studs in place in the tooling hole 702 of the base. The tooling base further includes a stop that is comprised of at least one post 705 that is threaded into the tooling base 701 and extends into the interior and fits within a pair of ridges on the threaded rod(s) 704.

Figure 8:
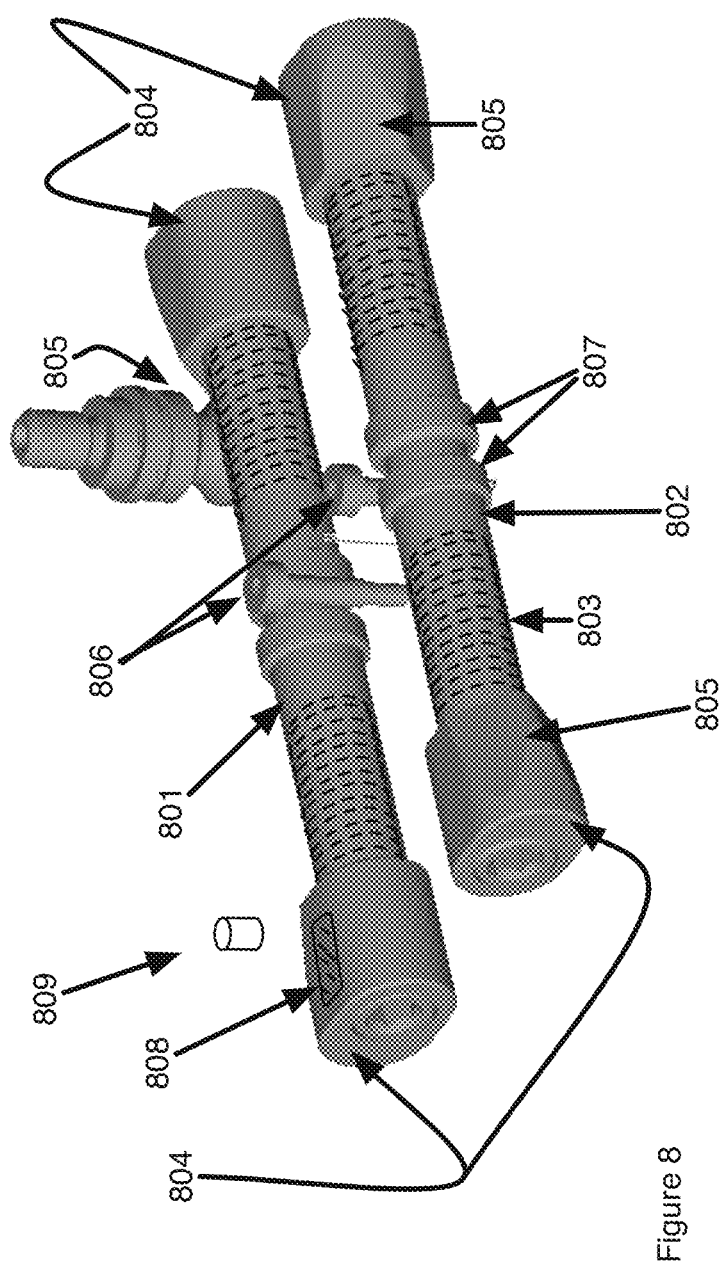
FIG. 8 shows the internal components of the tooling base of FIG. 8.

FIG. 8 shows details of interior components of the tooling base of FIG. 7. The tooling base is comprised of at least one threaded shaft 801, 802 (here two are shown) that include threaded regions 803. Clamping fixtures 804 include threaded holes (not labeled) and are threaded onto each end of the shafts. Right and left hand threads on the threaded shaft and the clamping fixtures result in alignment fixtures on a shaft to move towards each other when the shaft is rotated in a first direction and away from each other when the shaft is rotated in a second opposite direction. The clamping fixtures include at least one tapered region 805 that interacts with indentations on alignment studs (shown in previous figures) located in the tooling holes of the base, such that when the shaft is rotated and the clamping fixture moves toward and firmly contacts the alignment stud the stud is locked in place within the tooling hole thereby precisely locating a tooling fixture attached to the alignment stud relative to the tooling base. The tooling base further includes stops that limit the motion of the threaded rod and the attached clamping fixtures. In the embodiment shown the stop is comprised of a pair of ridges 807 located on each of the threaded shafts 801, 802 and a post 806 that fits through a hole on the tooling base and fits between the ridges on the threaded shaft such that the movement of the threaded shaft, in a direction parallel to the axis of the threaded shaft, is limited to the width of the space between the ridges. The stop limits travel of the threaded shaft to a preselected distance that distance being determined by the width of the space between the ridges on the threaded shaft. In the preferred embodiment shown in the figure the ridges 807 are circumferential ridges on the threaded shaft. In another embodiment (not shown) the ridges are located only in the region where contact would be made with the posts 806. In another embodiment, similar to that shown previously, the stop is comprised of a slot 808 that is cut into a surface of the clamping fixture 804 and a pin 809 that is attached through the tooling base and fits into the slot such that movement of the clamping fixture in the direction parallel to the axis of the threaded shaft is limited to the length of the slot. The number of clamping fixtures may be varied depending upon the application. In the embodiment shown there are two threaded shafts and four clamping fixtures. The threaded shafts operate independently. In another embodiment (not shown) there is a single threaded shaft and a single clamping fixture fitted to a first end of the threaded shaft. In another embodiment there is a single threaded shaft and two clamping fixtures, one threaded onto each end of the threaded shaft. In embodiments previously shown, a single threaded shaft is used to operate two clamping fixtures such that each clamp two of the alignment studs. In general, there is at least one threaded shaft that includes a stop and at least one clamping fixture that clamps at least one alignment stud in place upon rotation of the threaded shaft. The clamping fixture(s), when released, that is not engaging the alignment stud(s), and the threaded shaft may move relative to the base by an amount defined by the gap or slot in the stop. This play in the system enables a simplified clamping mechanism that is easier to manufacture while maintaining precision and accuracy of the registration of the tooling fixture to the tooling base. Prior art systems used clamping systems that either used significantly more moving parts, or, the shaft and the clamping mechanism are rigidly fixed therefore requiring more precision and extra steps and expense in manufacturing the clamping mechanism.

SUMMARY

A tooling base that is an improvement over current designs in the form of simplified number of parts and easier manufacturing of parts is described. The tooling base uses clamping fixtures on threaded rods that are restricted in their movement within the tooling base by stops. The stops are located either on the threaded shafts or on the clamping fixtures themselves. This allowed degree of movement enables simplified part design and manufacture while maintaining the precision and accuracy of registration of a tooling fixture with the tooling base.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:
1. A tooling base for removably aligning and attaching a tooling fixture to a work surface of a machine comprising:
 a) a base housing attached to the work surface of the machine, the base housing having an interior and tooling holes, the tooling holes fitted with tooling studs each having an indentation and the studs attached to the tooling fixture,
 b) a first clamping fixture fit inside a hollowed region within the base housing and including a threaded hole, and at least one tapered region, the at least one tapered region sized and shaped to fit the indentation on the tooling studs, and,
 c) a shaft having a length and an axis along the length of the shaft, the shaft fit inside a cylinder within the base housing, and, the shaft having threaded regions that fit inside the threaded hole on the first clamping fixture, whereby rotation of the shaft causes the first clamping fixture to move in a direction along the axis of the shaft, and,
 d) the first clamping fixture, removably attached to the shaft at the threaded region, and, the shaft and the first clamping fixture both removably fit inside the base housing, and,
 e) a stop that limits a movement of the shaft in a direction along the axis within the base housing, wherein the stop is comprised of a stud that is fixed to the base housing and extends to the interior of the base housing and fits between a pair of ridges on the shaft, the ridges having a distance between the pair of ridges, and, the movement of the shaft along its axis, within the base housing, is limited to the distance between the pair of ridges, and,
 f) when the shaft is rotated in a first direction, causing the first clamping fixture to move along the axis of the shaft and towards the tooling studs, the at least one tapered region on the first clamping fixture engage the indentation on the tooling studs thereby clamping the tooling studs within the tooling holes and clamping the tooling fixture to the base housing, and,
 g) when the shaft is rotated in a second direction, causing the first clamping fixture to move along the axis of the shaft away from the tooling studs, the at least one tapered region on the first clamping fixture disengages the indentation on the tooling studs thereby unclamping the tooling studs from the tooling holes and unclamping the tooling fixture from the base housing.

2. The tooling base of claim 1 comprising:
 a) a second clamping fixture, fit inside a second hollowed region within the base housing and including a threaded hole, and at least one tapered region, the at least one tapered region sized and shaped to fit the indentation on the tooling studs, and,
 b) the threaded regions on the shaft comprising right hand and left hand threaded regions whereby when the shaft is rotated in the first direction, the first clamping fixture and the second clamping move along the axis of the shaft and towards the tooling studs, and the at least one tapered region on the first clamping fixture and the at least one tapered region on the second clamping fixture, each engage the indentations on the tooling studs thereby clamping the tooling studs within the tooling holes and clamping the tooling fixture to the base housing, and,
 c) when the shaft is rotated in the second direction, causing the first clamping fixture and the second clamping fixture to move along the axis of the shaft away from the tooling studs, the at least one tapered region on the first clamping fixture and the at least one tapered region on the second clamping fixture disengage the indentations on the tooling studs thereby unclamping the tooling studs from the tooling holes and unclamping the tooling fixture from the base housing.

3. The tooling base of claim 1 wherein the first clamping fixture includes two tapered regions.

4. The tooling base of claim 1 wherein the base housing is made of a soft material and the tooling holes on the base housing include a bushing made of a hard material that has a hardness rating higher than a material used for the base housing, wherein the soft material is one selected from: aluminum, iron, steel, injection molded plastic, reinforced plastic, and, filled plastic, and, the hard material is one selected from steel, titanium, ceramic, and, filled or reinforced plastic.

5. A tooling base for removably aligning and attaching a tooling fixture to a work surface of a machine comprising:
 a) a base housing attached to the work surface of the machine, the base housing having an interior and tooling holes, the tooling holes fitted with tooling studs each having an indentation and the studs attached to the tooling fixture, and,
 b) a first clamping fixture fit inside a hollowed region within the base housing and including a threaded hole, and at least one tapered region, the at least one tapered region sized and shaped to fit the indentation on the tooling studs, and, a groove on a surface of the first clamping fixture, the groove having a length, and,
 c) a shaft having a length and an axis along the length of the shaft, the shaft fit inside a cylinder within the base housing, and, the shaft having threaded regions that fit inside the threaded hole on the first clamping fixture, whereby rotation of the shaft causes the first clamping fixture to move in a direction along the axis of the shaft, and,
 d) the first clamping fixture, removably attached to the shaft at the threaded region and the shaft both removably fit inside the base housing, and,
 e) a stop that limits a movement of the first clamping fixture in a direction along the axis of the shaft within the base housing, wherein the stop is comprised of a stud that is fixed to the base housing and extends to the interior of the base housing and fits within the groove on the surface of the first clamping fixture, and, the movement of the first clamping fixture along the axis of the shaft, within the base housing, is limited to the length of the groove, and,
 f) when the shaft is rotated in a first direction, causing the first clamping fixture to move along the axis of the shaft and towards the tooling studs, the at least one tapered region on the first clamping fixture engage the indentation on the tooling studs thereby clamping the tooling studs within the tooling holes and clamping the tooling fixture to the base housing, and,
 g) when the shaft is rotated in a second direction, causing the first clamping fixture to move along the axis of the shaft away from the tooling studs, the at least one tapered region on the clamping fixture disengages the indentation on the tooling studs thereby unclamping the tooling studs from the tooling holes and unclamping the tooling fixture from the base housing.

6. The tooling base of claim 5 comprising a second clamping fixture, fit inside a second hollowed region within the base housing and including a threaded hole, and at least one tapered region, the at least one tapered region sized and shaped to fit the indentation on the tooling studs, and, a groove on a surface of the second clamping fixture, the groove having a length, and,
 a) a stop that limits a movement of the second clamping fixture in a direction along the axis of the shaft within the base housing, wherein the stop is comprised of a stud that is fixed to the base housing and extends to the interior of the base housing and fits within the groove on the surface of the second clamping fixture, and, the movement of the second clamping fixture along the axis of the shaft, within the base housing, is limited to the length of the groove, and,
 b) when the shaft is rotated in the first direction, the first clamping fixture and the second clamping fixture move along the axis of the shaft and towards the tooling studs, and the at least one tapered region on the first clamping fixture and the at least one tapered region on the second clamping fixture, each engage the indentations on the tooling studs thereby clamping the tooling studs within the tooling holes and clamping the tooling fixture to the base housing, and,
 c) when the shaft is rotated in a second direction, causing the first clamping fixture and the second clamping fixture to move along the axis of the shaft away from the tooling studs, the at least one tapered region on the first clamping fixture and the at least one tapered region on the second clamping fixture disengage the indentations on the tooling studs thereby unclamping the tooling studs from the tooling holes and unclamping the tooling fixture from the base housing.

7. The tooling base of claim 6 wherein the first clamping fixture and the second clamping fixture each include two tapered regions.

8. The tooling base of claim 5 wherein the first clamping fixture includes two tapered regions.

9. The tooling base of claim 5 wherein the base housing is made of soft material and the tooling holes on the base housing include a bushing made of a hard material that has a hardness rating higher than the material used for the base housing, wherein soft material is one selected from: aluminum, iron, steel, injection molded plastic, reinforced plastic, and, filled plastic, and, hard material is one selected from steel, titanium, ceramic, and, filled or reinforced plastic.

* * * * *